(12) United States Patent
Nakamori

(10) Patent No.: US 11,068,219 B2
(45) Date of Patent: Jul. 20, 2021

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Yuki Nakamori, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/594,199

(22) Filed: Oct. 7, 2019

(65) Prior Publication Data

US 2020/0319833 A1    Oct. 8, 2020

(30) Foreign Application Priority Data

Apr. 2, 2019 (JP) .............................. JP2019-070509

(51) Int. Cl.
```
G06F 3/12      (2006.01)
G06Q 20/10     (2012.01)
G06Q 20/32     (2012.01)
G06K 15/02     (2006.01)
```
(52) U.S. Cl.
CPC .......... *G06F 3/1272* (2013.01); *G06F 3/1203* (2013.01); *G06F 3/1238* (2013.01); *G06F 3/1288* (2013.01); *G06Q 20/102* (2013.01)

(58) Field of Classification Search
None
See application file for complete search history.

(56) References Cited

U.S. PATENT DOCUMENTS

| | | | | |
|---|---|---|---|---|
| 2002/0057452 | A1* | 5/2002 | Yoshino | ............. H04N 1/00145 358/1.15 |
| 2008/0244721 | A1* | 10/2008 | Barrus | ................ G06F 21/6254 726/9 |
| 2016/0086144 | A1* | 3/2016 | Kishida | .................. G07F 17/26 705/40 |

FOREIGN PATENT DOCUMENTS

| | | | |
|---|---|---|---|
| JP | 2016-146137 A | 8/2016 | |
| JP | 2016146137 | * 8/2016 | ............... G06F 3/12 |

* cited by examiner

Primary Examiner — Beniyam Menberu
(74) Attorney, Agent, or Firm — Oliff PLC

(57) ABSTRACT

An information processing apparatus includes a registration unit that registers an image that is to be output, a receiving unit that receives an instruction to issue identification information identifying the image that is registered by the registration unit, an identifying unit that identifies a billing destination when the image which the instruction to issue the identification information is provided for is output, and an issuing unit that issues the identification information, associated with the billing destination identified by the identifying unit, for the image which the receiving unit has received the instruction to issue the identification information for.

9 Claims, 18 Drawing Sheets

FIG. 4

| USER ID | USER NAME | DIVISION NAME AT BILLING DESTINATION |
|---|---|---|
| U0001 | AAA | SALES DIVISION 1 |
| U0002 | BBB | SALES DIVISION 2 |
| U0003 | CCC | SALES DIVISION 2 |
| U0004 | DDD | SALES DIVISION 3 |
| U0005 | EEE | PRODUCT PLANNING DIVISION |

FIG. 5

| BILLING DESTINATION CODE | DIVISION NAME AT BILLING DESTINATION |
|---|---|
| D001 | SALES DIVISION 1 |
| D002 | SALES DIVISION 2 |
| D003 | SALES DIVISION 3 |
| D004 | SALES DIVISION 4 |
| D005 | PRODUCT PLANNING DIVISION |

FIG. 6

| DOCUMENT ID | DOCUMENT NAME | THUMBNAIL IMAGE | PRINT SETTING | REGISTRATION RESULTS |
|---|---|---|---|---|
| DOC11123 | COMPARISON OF SELLING POINTS | ...... | ...... | NORMALLY ENDED |
| DOC12345 | COMPARISON MATERIALS WITH CORPORATION FFF | ...... | ...... | NORMALLY ENDED |
| DOC122334 | PRESENTATION MATERIALS FOR CORPORATION GGG | ...... | ...... | ERROR |

FIG. 9

| CORPORATION CODE | CORPORATION NAME |
|---|---|
| C001 | CORPORATION A |
| C002 | CORPORATION B |
| C003 | CORPORATION C |

FIG. 10

| CORPORATION CODE | CORPORATION NAME | BILLING DESTINATION CODE | DIVISION NAME AT BILLING DESTINATION |
|---|---|---|---|
| C001 | CORPORATION A | D101 | ACCOUNTING DIVISION |
| C002 | CORPORATION B | D001 | SALES DIVISION 1 |
| | | D002 | SALES DIVISION 2 |
| | | D003 | SALES DIVISION 3 |
| | | D004 | SALES DIVISION 4 |
| | | D005 | PRODUCT PLANNING DIVISION |
| C003 | CORPORATION C | D201 | LEGAL DIVISION |

FIG. 11

| DOCUMENT ID | DOCUMENT NAME | PRINT DATA | THUMBNAIL IMAGE | PRINT SETTING |
|---|---|---|---|---|
| DOC11123 | COMPARISON OF SELLING POINTS | ..... | ..... | ..... |
| DOC12345 | COMPARISON MATERIALS WITH CORPORATION FFF | ..... | ..... | ..... |
| DOC122334 | PRESENTATION MATERIALS FOR CORPORATION GGG | ..... | ..... | ..... |

FIG. 12

| RESERVATION NUMBER | BILLING DESTINATION CODE | DOCUMENT ID |
|---|---|---|
| AS98XM1PB | D002 | DOC12345 |
| DSF587PK7 | D002 | DOC45678 |
| SD45GH78 | D001 | DOC33333 |
| G254KJUH5 | D003 | DOC01011 |
| EWT654HF | D004 | DOC11223 |

FIG. 13

| RESERVATION NUMBER | BILLING DESTINATION CODE | PAPER SHEET SIZE | COLOR MODE | DUPLEX PRINTING | PRINT COPIES | FEE |
|---|---|---|---|---|---|---|
| AS98XM1PB | D002 | A4 | COLOR | YES | 2 | 80 |
| DSF587PK7 | D002 | A4 | COLOR | NO | 1 | 20 |
| SD45GH78 | D211 | A4 | MONOCHROME | NO | 2 | 40 |
| G254KJUH5 | D003 | A3 | MONOCHROME | YES | 1 | 30 |
| EWT654HF | D104 | B5 | COLOR | NO | 4 | 50 |

FIG. 14

| CORPORATION CODE | CORPORATION NAME | BILLING DESTINATION CODE | DIVISION NAME AT BILLING DESTINATION | AMOUNT BILLED |
|---|---|---|---|---|
| C002 | CORPORATION B | D001 | SALES DIVISION 1 | $ 102.80 |
| C002 | CORPORATION B | D002 | SALES DIVISION 2 | $ 28.50 |
| C002 | CORPORATION B | D003 | SALES DIVISION 3 | $ 68.00 |
| C002 | CORPORATION B | D004 | SALES DIVISION 4 | $ 12.00 |
| C002 | CORPORATION B | D005 | PRODUCT PLANNING DIVISION | $ 21.00 |

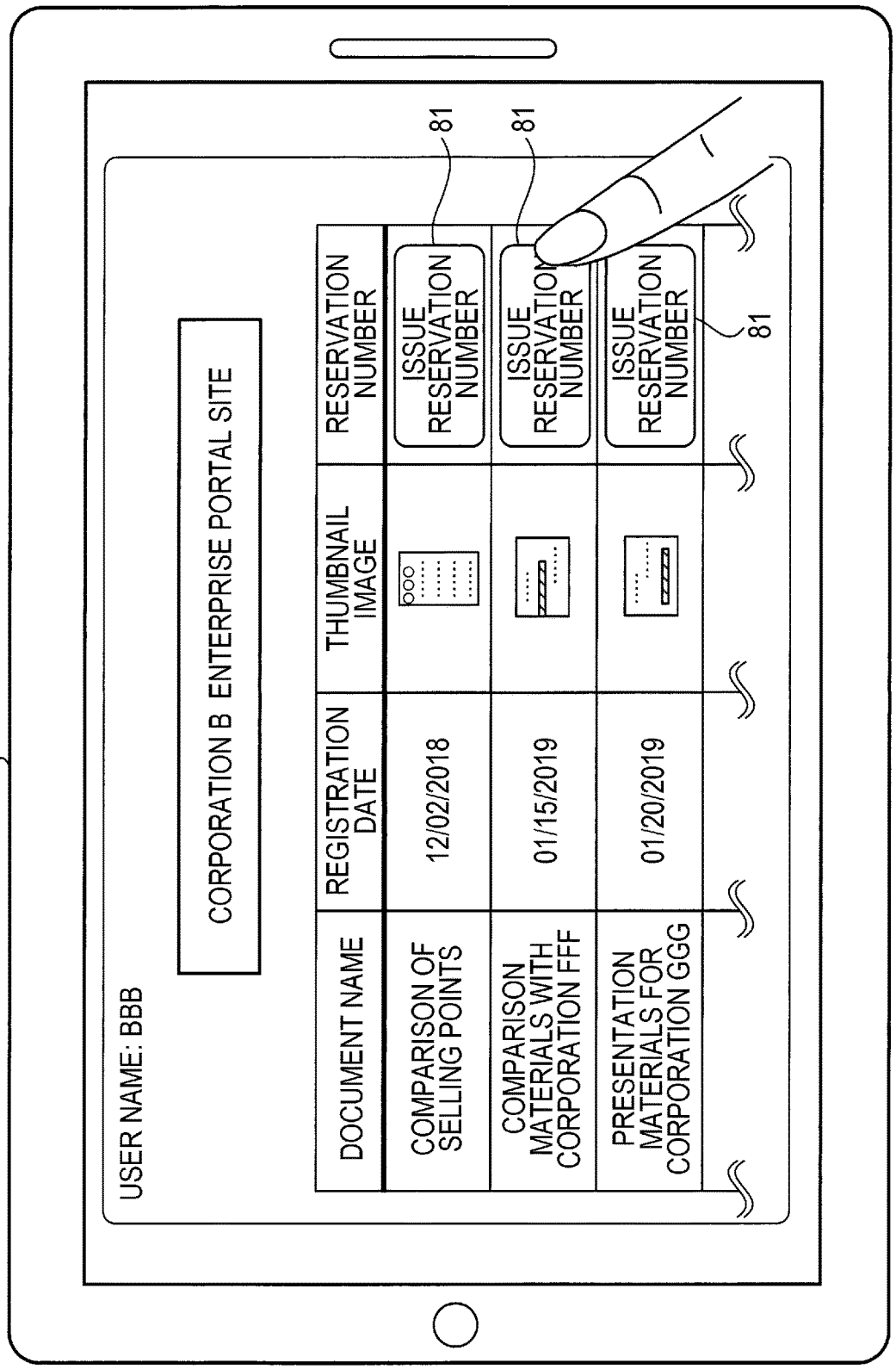

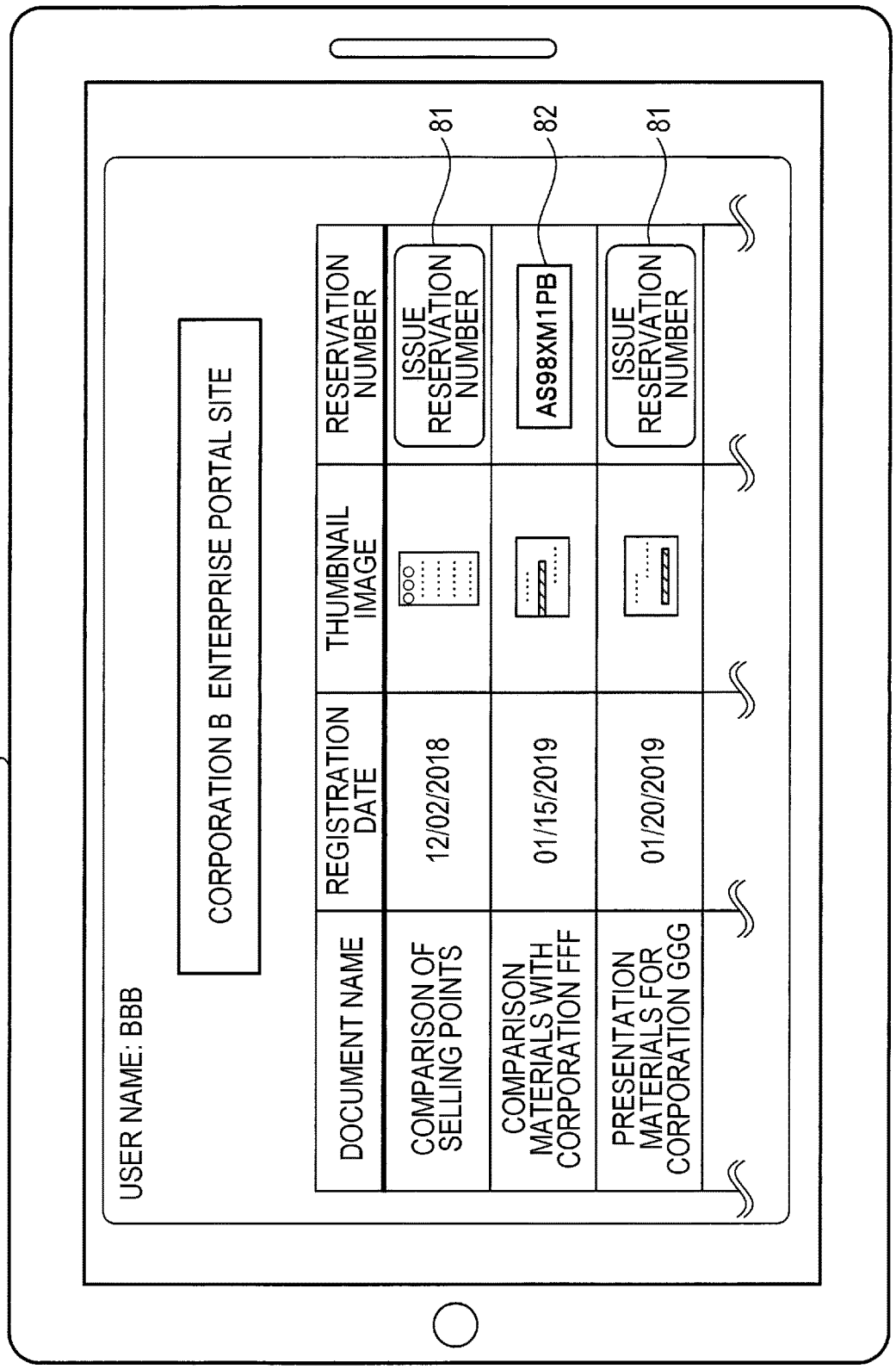

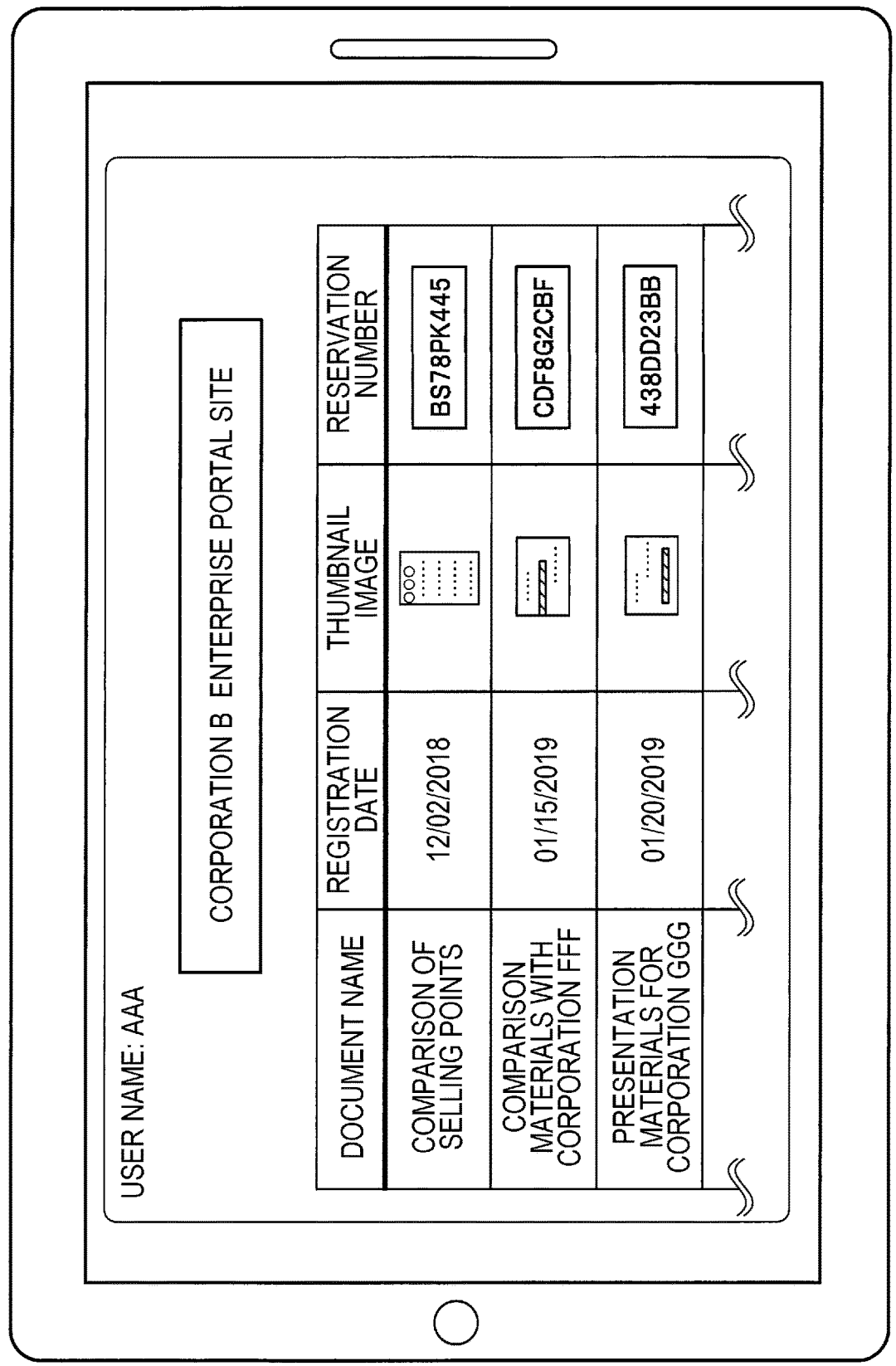

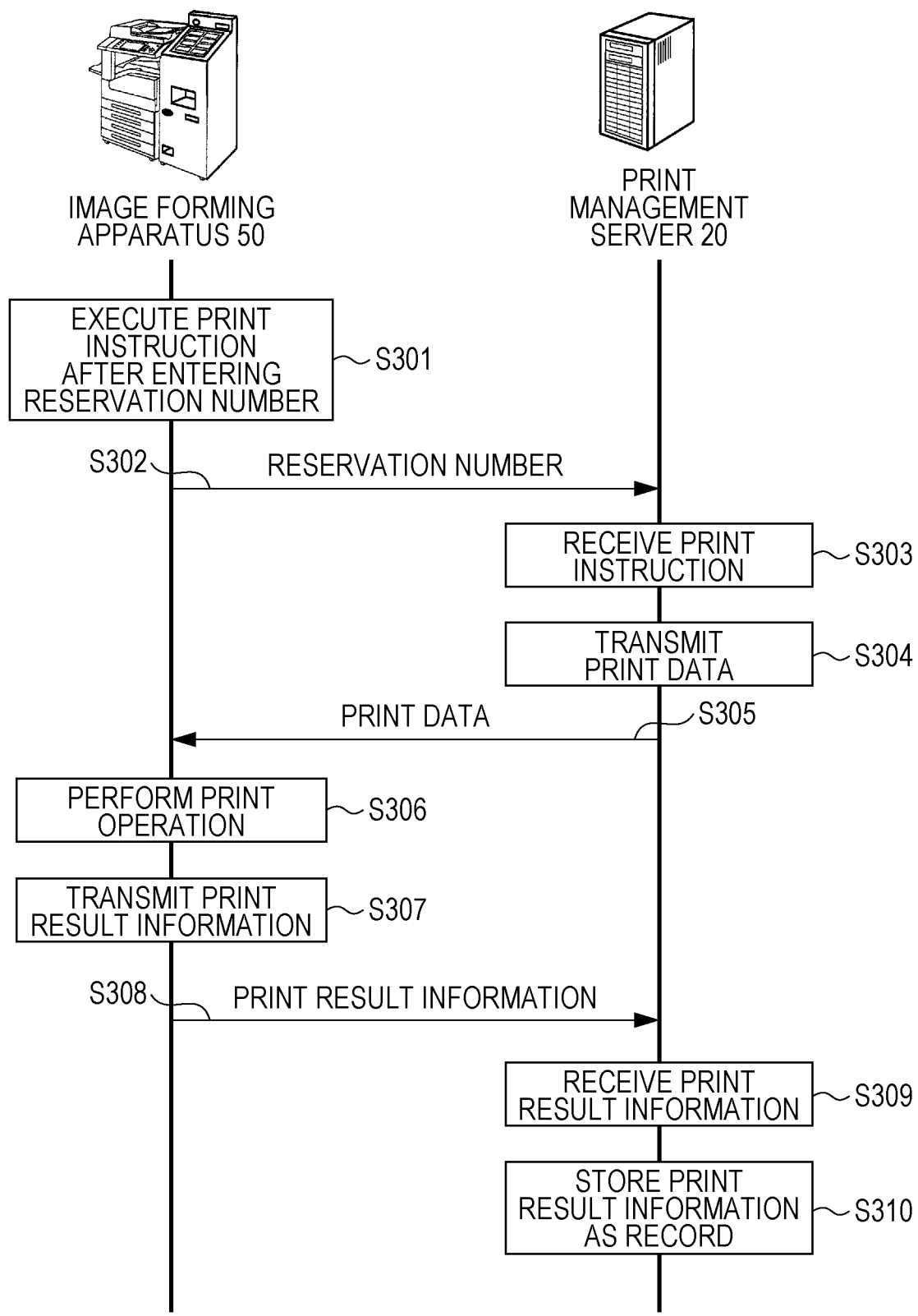

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-070509 filed Apr. 2, 2019.

BACKGROUND

(i) Technical Field

The present disclosure relates to an information processing apparatus and a non-transitory computer readable medium.

(ii) Related Art

Japanese Unexamined Patent Application Publication No. 2016-146137 discloses a billing management system. In the billing management system disclosed, a user belonging to an organization issues a reservation identity (ID) by selecting a billing destination during reservation of printing and by associating the reservation ID with information on the billing destination. The billing management system thus reflects on a billing management apparatus of the organization a fee for which the user has used an image processing apparatus not belonging to the organization.

SUMMARY

Aspects of non-limiting embodiments of the present disclosure relate to providing an information processing apparatus that reduces the number of pieces of identification information to be issued in comparison with the case in which, even though identification information corresponding to all users likely to output images has been issued at image registration, image outputting is not necessarily performed by all users who have issued identification information.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus. The information processing apparatus includes a registration unit that registers an image that is to be output, a receiving unit that receives an instruction to issue identification information identifying the image that is registered by the registration unit, an identifying unit that identifies a billing destination when the image which the instruction to issue the identification information is provided for is output, and an issuing unit that issues the identification information, associated with the billing destination identified by the identifying unit, for the image which the receiving unit has received the instruction to issue the identification information for.

BRIEF DESCRIPTION OF THE DRAWINGS

Exemplary embodiment of the present disclosure will be described in detail based on the following figures, wherein:

FIG. 4 illustrates an example of a user identity (ID) management table stored on a management table memory;

FIG. 5 illustrates an example of a billing destination management table stored on the management table memory;

FIG. 6 illustrates an example of a document data management table stored on the management table memory;

FIG. 9 illustrates an example of a corporation code management table stored on the management table memory;

FIG. 10 illustrates an example of a billing destination management table stored on the management table memory;

FIG. 11 illustrates an example of a document data management table stored on the management table memory;

FIG. 12 illustrates an example of a reservation number management table stored on the management table memory;

FIG. 13 illustrates an example of a print result management table stored on the management table memory;

FIG. 14 illustrates an example of a billing amount management table that is generated in accordance with the print result management table in FIG. 13;

FIG. 17 illustrates a list of registered documents displayed on a terminal apparatus;

FIG. 18 illustrates an example displayed when a reservation number is displayed on the enterprise portal site in response to an operation performed on a reservation number issuing button;

FIG. 19 illustrates an example displayed when reservation numbers have been issued for all of the document data posted on the enterprise portal site; and FIG. 20 is a sequence chart of a print process that is performed in accordance with the issued reservation number.

DETAILED DESCRIPTION

Embodiment of the disclosure is described in detail below with reference to the drawings.

Figure 1:
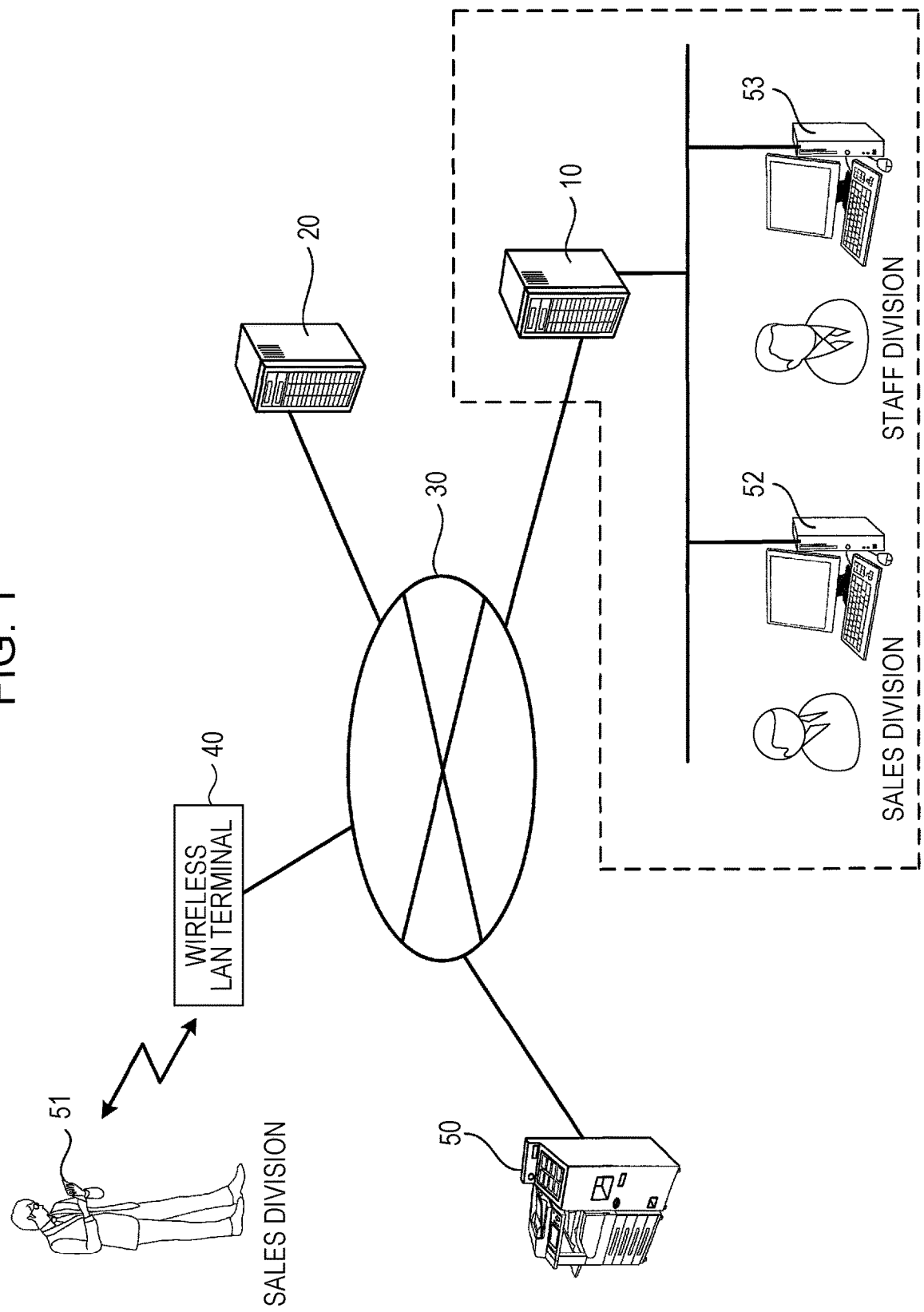
FIG. 1 illustrates the system configuration of an information processing system of an exemplary embodiment of the disclosure.

FIG. 1 illustrates the system configuration of an information processing system of an exemplary embodiment of the disclosure.

Referring to FIG. 1, the information processing system includes an image forming apparatus 50, print management server 20, and enterprise portal server 10. These elements are connected to each other via the Internet 30.

The image forming apparatus 50 is a multi-function apparatus having a print function, scan function, copy function, fax function and the like. The image forming apparatus 50 is connected to an operation terminal having a user interface function with a touch panel, fee settlement function, and the like.

For example, the image forming apparatus 50 is installed at a convenience store. A user may receive a variety of services, including copying, faxing, and photographic printing by paying fees for them with electronic money or cash.

An image to be printed may be registered beforehand on the print management server 20 and a reservation number serving as identification information may be issued beforehand to identify the registered image. The user may download registered image data for printing by entering the reservation number on the image forming apparatus 50.

Specifically, if the image data to be printed is registered beforehand onto the print management server 20 from a personal computer at home or office, the reservation number is issued. If the user goes to the installation location of the image forming apparatus 50 and enters the issued reservation number on the image forming apparatus 50, the image data associated with the reservation number is downloaded for printing from the print management server 20 to the image forming apparatus 50.

In accordance with the exemplary embodiment, the reservation number is identification information that identifies an image to be output. If the information processing system of the exemplary embodiment performs a specific process, the reservation number is identification information used to perform the specific process.

The enterprise portal server 10 may be installed in an office of a company and may provide an enterprise portal site that is viewable to only employees of the company.

The employee may view the enterprise portal site by accessing the enterprise portal server 10 by operating one of terminal apparatuses 51 through 53.

Referring to FIG. 1, terminal apparatuses 52 and 53 access the enterprise portal site via an office network and the terminal apparatus 51 access the enterprise portal server 10 via the Internet 30 and wireless LAN terminal 40.

To access the enterprise portal server 10 to view the enterprise portal site, a worker may enter a predetermined user identification (ID) and password and may be authenticated. Only if the worker has been successfully authenticated, the worker is able to view the enterprise portal site.

In the information processing system of the exemplary embodiment, images of a variety of documents are registered on the enterprise portal server 10 and the print management server 20 is designed to issue the reservation numbers of the registered images. The user may thus print a desired image by entering the reservation number of the selected image from among the registered images onto the image forming apparatus 50.

A corporation user may use the information processing system. In such a case, the corporation user is free from paying the fee on the image forming apparatus 50 there. A billing destination is registered beforehand and a reservation number associated with the registered billing destination is issued. In such a system, without paying the fee there, the user of the corporation may print an image registered beforehand by simply entering the reservation number. The usage fee is later billed to the billing destination.

In such a system, a user who has registered an image on the enterprise portal site may be occasionally different from a user who outputs the image registered on the enterprise portal site.

For example, if workers in a staff division for a sales operation produce catalogs, proposal documents, and leaflets and register them on the enterprise portal server 10. Each sales division may select and print a document from the registered documents by viewing the enterprise portal site on the terminal apparatuses 51 and 52.

Specifically, in the information processing system in FIG. 1, a worker in the staff division registers an image on the enterprise portal server 10 using the terminal apparatus 53 and a worker in the sales division views the enterprise portal site from one of the terminal apparatuses 51 and 52 and selects an image to be printed.

In such an operation mode, the user in each sales division sums the usage fees on a per division basis. If multiple different reservation numbers having different billing destinations are issued for the same image, a user in each sales division may print the image at the cost of the user's own sales division by simply using the reservation number of the user's own sales division.

If the number of images to be registered to the enterprise portal site increases and the number of sales divisions having different billing destinations increases, a large number of reservation numbers corresponding to the product of the number of images and the number of sales divisions are to be issued beforehand. For example, there are 20 sales divisions and 100 images are to be registered, 2000 reservation numbers are to be issued beforehand. Although the reservation numbers are issued for all the users who are likely to output images, all the users do not necessarily output images later. Some users having reservation numbers issued may not actually output images. Even if a large number of reservation numbers has been issued, only a subpart of the reservation numbers is actually used.

If reservation numbers that are not actually used are continuously issued, available reservation numbers are insufficient. Increasing the number of characters of the reservation number may be performed.

The enterprise portal server 10 of the exemplary embodiment thus reduces the number of reservation numbers to be issued as described below in comparison with the case where users who registers images are different from users who output images and even though the reservation numbers are issued for all the users who are likely to output images, all the user having the reservation numbers issued do not necessarily output images.

Figure 2:
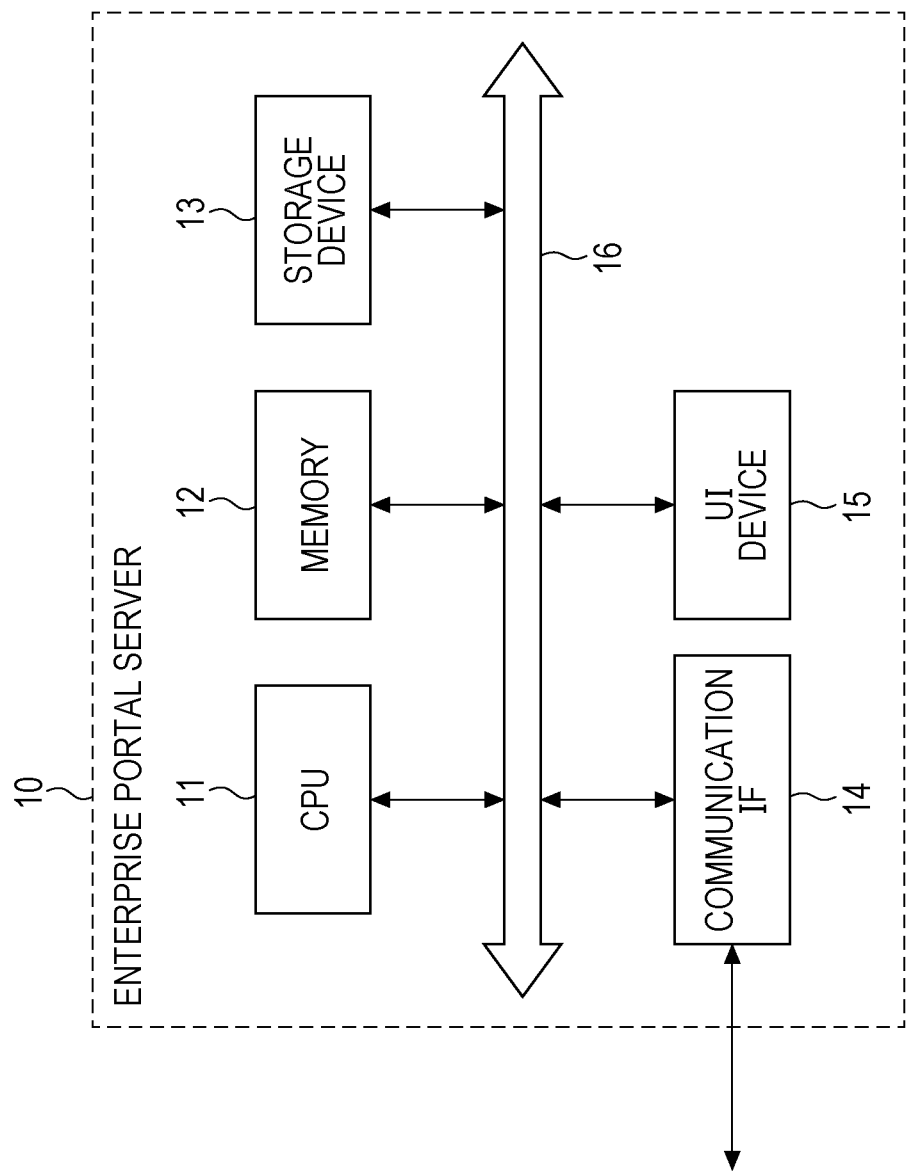
FIG. 2 illustrates the hardware configuration of an enterprise portal server of the exemplary embodiment of the disclosure.

FIG. 2 illustrates the hardware configuration of the enterprise portal server 10 in the information processing system of the exemplary embodiment.

Referring to FIG. 2, the enterprise portal server 10 includes a central processing unit (CPU) 11, memory 12, storage device 13, such as a hard disk drive, communication interface (IF) 14 that transmits data to or receives data from an external device via the Internet 30 and office network, and user interface (UI) device 15 including a touch panel or a liquid-crystal display and keyboard. These elements are mutually interconnected to each other via a control bus 16.

The CPU 11 controls the enterprise portal server 10 by performing a predetermined process in accordance with a control program stored on the memory 12 or the storage device 13. In accordance with the exemplary embodiment, the CPU 11 reads the control program from the memory 12 or the storage device 13 and executes the read control program. Alternatively, the control program may be stored on a compact disk read-only memory (CD-ROM) and provided in a recorded form on the CD-ROM to the CPU 11.

Figure 3:
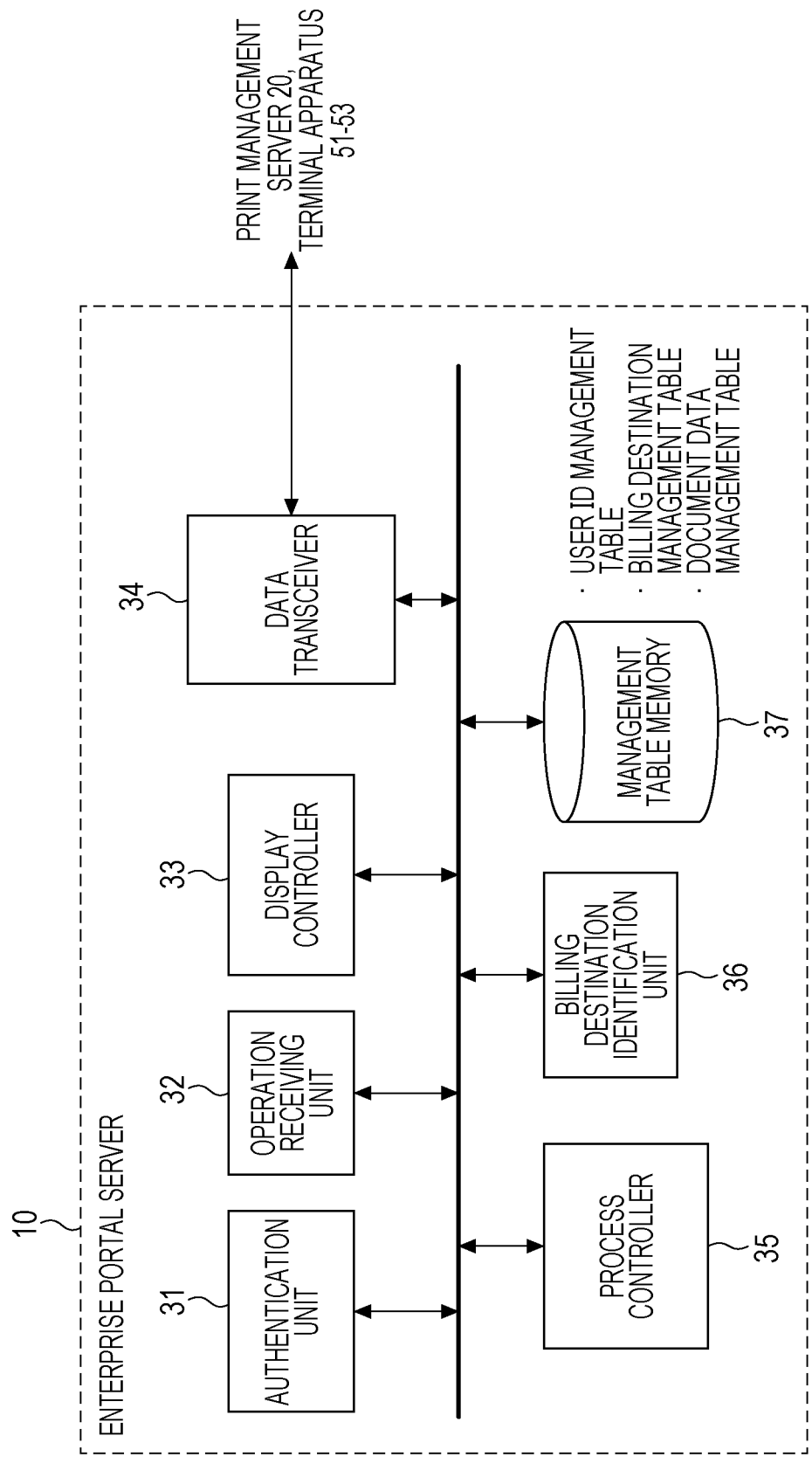
FIG. 3 is a functional block diagram illustrating the enterprise portal server of the exemplary embodiment of the disclosure.

FIG. 3 is a functional block diagram illustrating the enterprise portal server 10 that is implemented when the control program is executed.

Referring to FIG. 3, the enterprise portal server 10 of the exemplary embodiment includes an authentication unit 31, operation receiving unit 32, display controller 33, data transceiver 34, process controller 35, billing destination identification unit 36, and management table memory 37.

The authentication unit 31 authenticates a user who is accessing the enterprise portal site.

The data transceiver 34 transmits data to or receives data from each of the print management server 20 and the terminal apparatuses 51 through 53.

The process controller 35 receives document data to be posted on the enterprise portal site from the terminal apparatus 53 of a user in the staff division and requests the print management server 20 to register the document data. The registration request includes the document data, and parameter information on a paper sheet size, color mode (color or monochrome), and expiration date. Specifically, the process controller 35 functions as a registration unit that registers an image to be printed.

In accordance with the exemplary embodiment, a target displayed in a list on the enterprise portal site is the document data. The target may also include image data.

The operation receiving unit 32 receives a variety of operations from the user of each of the terminal apparatuses 51 through 53. The operation receiving unit 32 receives an instruction to issue a reservation number for the document data that has undergone the registration operation on the print management server 20.

When the operation receiving unit 32 receives the instruction to issue the reservation number, the process controller 35 specifies a billing destination code identified by the billing destination identification unit 36 and a document ID of the document data for which the issue instruction of the reservation number is made. The process controller 35 thus request the print management server 20 to issue the reservation number. Upon receiving the reservation number from the print management server 20, the process controller 35 displays the received reservation number on the enterprise portal site.

The process controller 35 functions as an issuing unit that issues the reservation number, associated with the billing destination identified by the billing destination identification unit 36, for the document for which the operation receiving unit 32 has received the instruction to issue the reservation number.

The process controller 35 stores in an association table the issued reservation number, the billing destination code, and the document ID. If the user of the same division has provided an instruction to issue the reservation number for the same image, the same reservation number will be issued.

The display controller 33 controls the enterprise portal site that is displayed on the terminal apparatuses 51 through 53. Specifically, the display controller 33 displays in a list a thumbnail image of a document registered on the print management server 20 by the process controller 35 together with information including the document name and registration date. The display controller 33 displays a reservation-number issue button for each document displayed in a list on the enterprise portal site.

When the user selects the reservation-number issue button, the operation receiving unit 32 receives the issue instruction of the reservation number.

If another user of the same group has issued the reservation number for any of the registered images, the display controller 33 performs control to display the reservation number, issued by the other user on the enterprise portal site, to the user who has been authenticated when the registered image is reviewed.

The billing destination identification unit 36 identifies the billing destination when the image which the instruction to issue the reservation number has been provided for is output. For example, if the billing destination is managed by using the billing destination code, the billing destination identification unit 36 identifies the billing destination code, preset for the division to which the user belongs and for which the user has provided the instruction to issue the reservation number, as billing destination information on the destination which the print management server 20 is requested to issue the reservation number for.

To view the enterprise portal site, the authentication unit 31 authenticates the user. To this end, the billing destination identification unit 36 identifies the billing destination code, which is used to bill the group of the user who is authenticated when the document registered on the print management server 20 is viewed on the enterprise portal site, as a billing destination when the image which the instruction to issue the reservation number is provided for.

The management table memory 37 stores a variety of management tables, including a user identity (ID) management table, billing destination management table, and document management table.

FIG. 4 illustrates an example of the user ID management table stored on the management table memory 37.

Referring to FIG. 4, the user ID management table stores on a per user basis a user ID, user name, and billing destination division name in association with each other. The billing destination division name is the name of the division to which each user belongs.

FIG. 5 illustrates an example of the billing destination management table stored on the management table memory 37.

Referring to FIG. 5, the billing destination management table stores the billing destination code serving as the billing destination information and the billing destination division in association with each other.

The billing destination identification unit 36 acquires information on the billing destination division name in accordance with the user ID of the authenticated user and the user ID management table in FIG. 4. The billing destination identification unit 36 identifies the billing destination code in accordance with the acquired billing destination division name and the billing destination management table in FIG. 5.

FIG. 6 illustrates an example of the document data management table stored on the management table memory 37.

Referring to FIG. 6, the document data management table stores the document ID identifying each document, document name, thumbnail image, information on print settings, and information on registration results in association with each other. The print management server 20, when requested to register the document, issues the document ID.

In accordance with the exemplary embodiment, when the document is registered on the print management server 20, any reservation number associated with a billing destination code is not issued. Namely, no reservation number is issued even if a user in the staff division registers a document on the enterprise portal server 10 using the terminal apparatus 53 and lists the document in the document list on the enterprise portal site.

Even if the instruction to issue the reservation number is not provided when the document is registered, the reservation number associated with the billing destination code predetermined for each document registered may be issued.

If a user in a sales division 1 in the billing destination management table in FIG. 5 has a higher frequency of printing registered documents and the probability of issuing the reservation number is predicted to be higher, the reservation number associated with billing destination code "D001" of the sales division 1 may be automatically issued.

The billing destination that is used to bill a group that is predicted to have a higher frequency of printing documents is not set to be a predetermined billing destination. Alternatively, a billing destination that is used to bill a group that has a higher number of registered users than the other groups may be set to be a predetermined billing destination.

For example, if the number of users in the sales division 1 is determined to be higher than the number of users in another division in the billing destination management table in FIG. 5, the reservation number associated with the billing destination code "D001" of the sales division 1 may be automatically issued. The number of reservation numbers issued beforehand may be one or more for the sales division 1 having the highest number of users.

Whether the reservation number is issued beforehand may be determined based on the features of each division. For example, the features of the division may be the number of staff members of the division and frequency of printing and are thus related to printing. Whether the reservation number is issued beforehand may also be determined based on the property of the document. For example, if the registered document is sales-promotion leaflets for a new product, the sales division may print them and the corresponding reservation number may be automatically issued. The features of the division and the property of the document may be combined. For example, if the document to be registered is sales-promotion leaflets for a new product and available information indicates that the division in charge of selling the product is the sales division 1, the reservation number for the sales division 1 may be automatically issued by combining these pieces of information.

Figure 7:
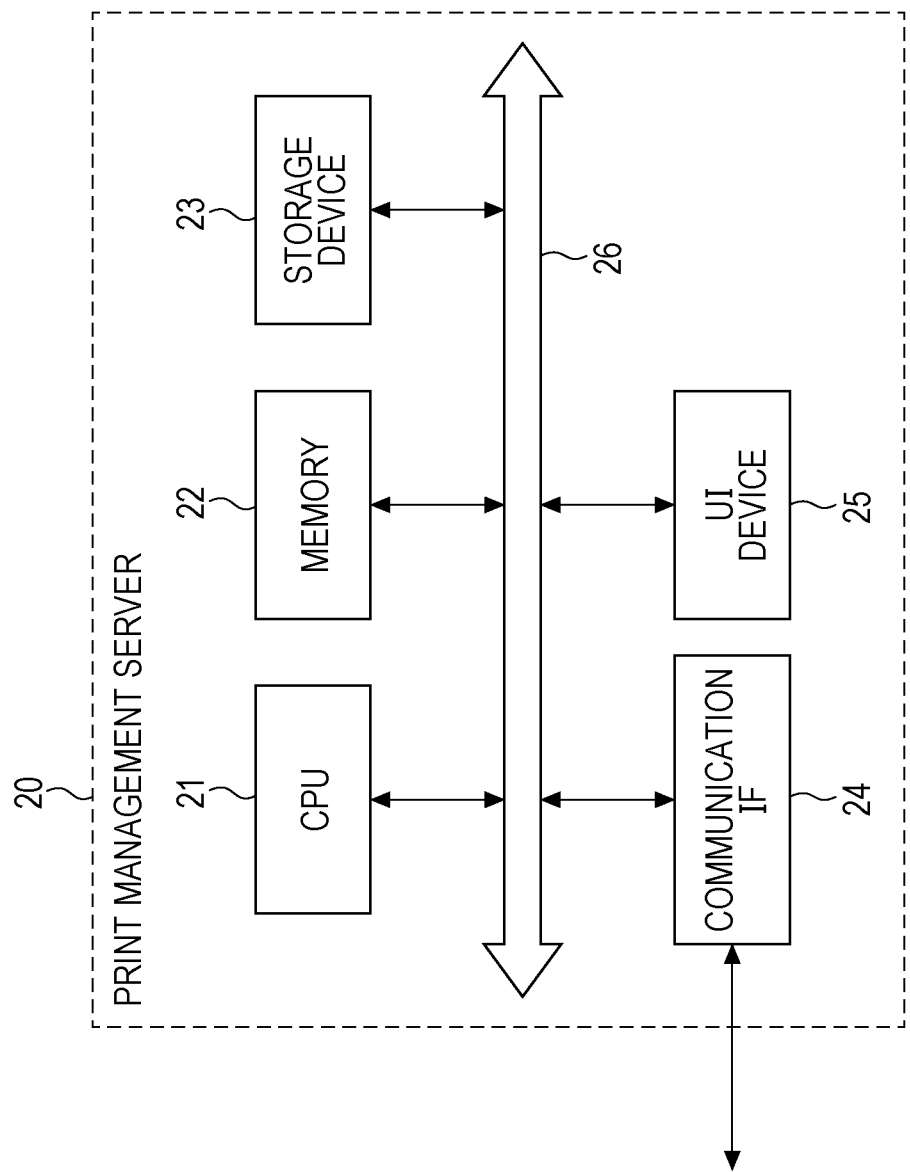
FIG. 7 illustrates the hardware configuration of a print management server of the exemplary embodiment of the disclosure.

FIG. 7 illustrates the hardware configuration of the print management server 20 in the information processing system of the exemplary embodiment.

Referring to FIG. 7, the print management server 20 includes a CPU 21, memory 22, storage device 23, such as a hard disk drive, communication interface (IF) 24 that transmits data to or receives data from an external apparatus, such as the enterprise portal server 10 and the image forming apparatus 50 via the Internet 30, and user interface (UI) device 25 including a touch panel or a liquid-crystal display and a keyboard. These elements are interconnected to each other via a control bus 26.

The CPU 21 controls the print management server 20 by performing a predetermined process in accordance with a control program stored on the memory 22 or the storage device 23. In accordance with the exemplary embodiment, the CPU 21 reads the control program from the memory 22 or the storage device 23 and executes the read program. The control program may be stored on a CD-ROM and then delivered to the CPU 21.

Figure 8:
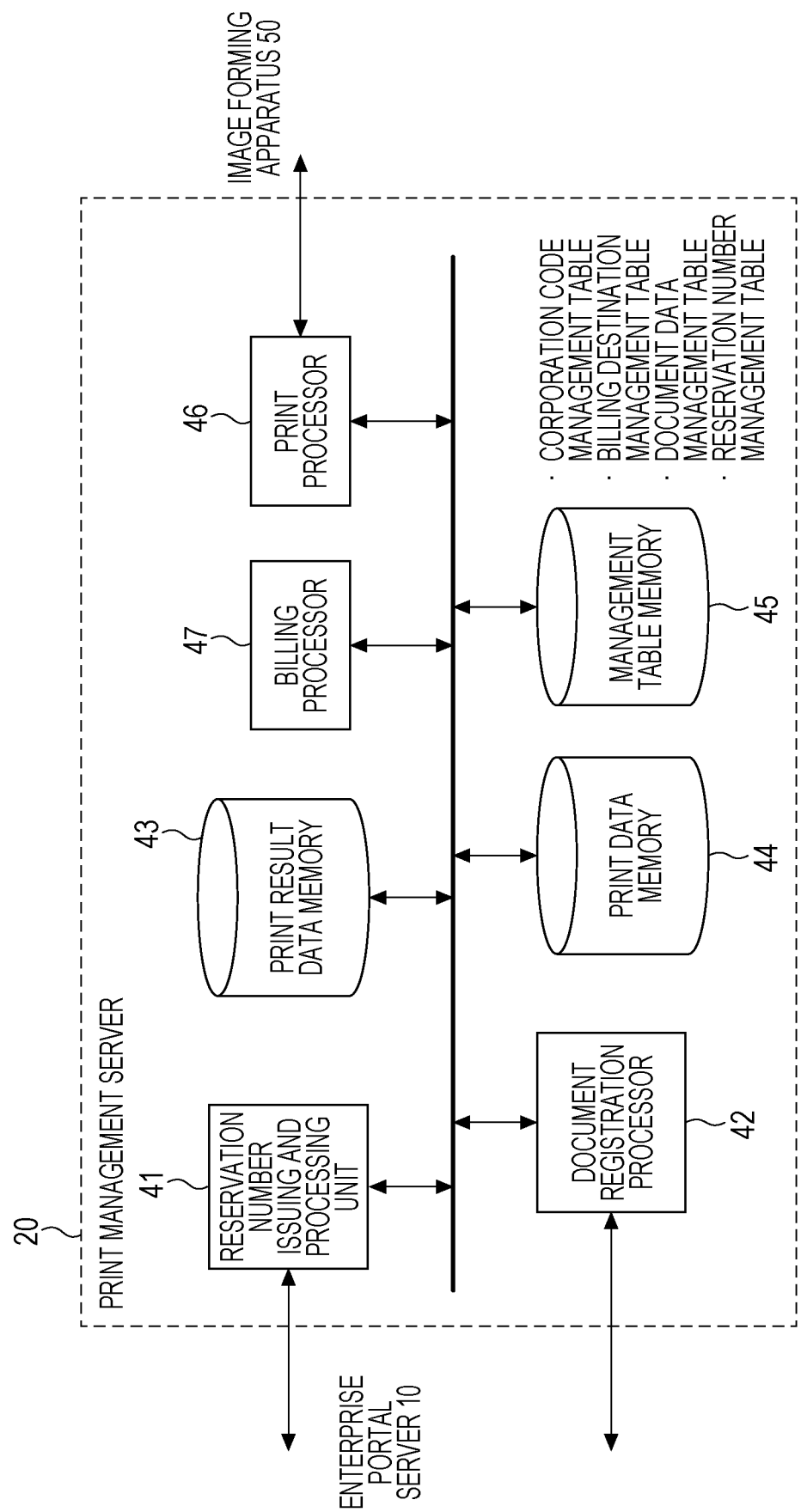
FIG. 8 is a functional block diagram illustrating the print management server of the exemplary embodiment of the disclosure.

FIG. 8 is a functional block diagram illustrating the print management server 20 that is implemented by executing the control program.

Referring to FIG. 8, the print management server 20 of the exemplary embodiment includes a reservation number issuing and processing unit 41, document registration processor 42, print result data memory 43, print data memory 44, management table memory 45, print processor 46, and billing processor 47.

The management table memory 45 stores a variety of management tables including a corporation code management table, billing destination management table, document management table, and reservation number management table.

FIG. 9 illustrates an example of the corporation code management table stored on the management table memory 45. The corporation code management table stores a corporation code and a corporation name in association with each other as illustrated in FIG. 9.

FIG. 10 illustrates an example of the billing destination management table stored on the management table memory 45. Referring to FIG. 10, the billing destination management table stores a corporation code and billing destination code in association with each other.

The document registration processor 42 receives a document registration request from the enterprise portal server 10, converts the document data included in the document registration request into print data, and stores the print data onto the print data memory 44. The document registration processor 42 stores the converted print data with a document ID attached thereto in the document data management table. The document registration processor 42 returns the document ID attached to the document ID to the enterprise portal server 10 that has transmitted the document registration request.

FIG. 11 illustrates an example of the document data management table stored on the management table memory 45.

Referring to FIG. 11, the document data management table stores, in an associated form, a variety of information including a document ID, document name, print data, thumbnail image, and information on print settings.

The reservation number issuing and processing unit 41 receives from the enterprise portal server 10 a reservation number issue request that specifies the document ID and billing destination code. After verifying that the previously issued reservation numbers do not include any reservation number having the same document ID and the same billing destination code, the reservation number issuing and processing unit 41 issues a reservation number that is associated with the document ID and the billing destination code included in the reservation number issue request.

The reservation number issuing and processing unit 41 associates the issued reservation number with the document ID and billing destination code and causes the management table memory 45 to store these pieces of information as the reservation number management table.

FIG. 12 illustrates an example of the reservation number management table stored on the management table memory 45. The reservation number management table in FIG. 12 stores a reservation number, billing destination code, and document ID in association with each other.

Upon receiving from the image forming apparatus 50 a print instruction specifying the reservation number, the print processor 46 searches the reservation number management table according to the specified reservation number and identifies the document ID corresponding to the specified reservation number. The print processor 46 acquires from the document data management table in FIG. 11 the print data (or storage location) corresponding to the identified document ID.

The print processor 46 transmits the acquired print data to the image forming apparatus 50. The image forming apparatus 50 performs a print operation in response to the print data transmitted from the print management server 20 and transmits process results to the print management server 20.

The print result data memory 43 stores result data of the print operation performed by the print processor 46.

FIG. 13 illustrates an example of the print result management table stored on the management table memory 45.

Referring to FIG. 13, the print result management table stores details of the print job performed. Specifically, the print result management table stores a reservation number, billing destination code, paper sheet size, color mode, duplex printing, print copies, and fee in association with each other.

The billing processor 47 totals the print fees on a per billing destination basis during a specified period of time from the print result management table, generates a billing amount management table, and performs a billing operation.

FIG. 14 illustrates an example of the billing amount management table in accordance with which a corporation B having a corporation code "C002" is billed.

In the billing amount management table in FIG. 14, the corporation B is charged with billing amounts different from billing destination to billing destination.

The process of the information processing apparatus of the exemplary embodiment is described in detail below with reference to the drawings.

Figure 15:
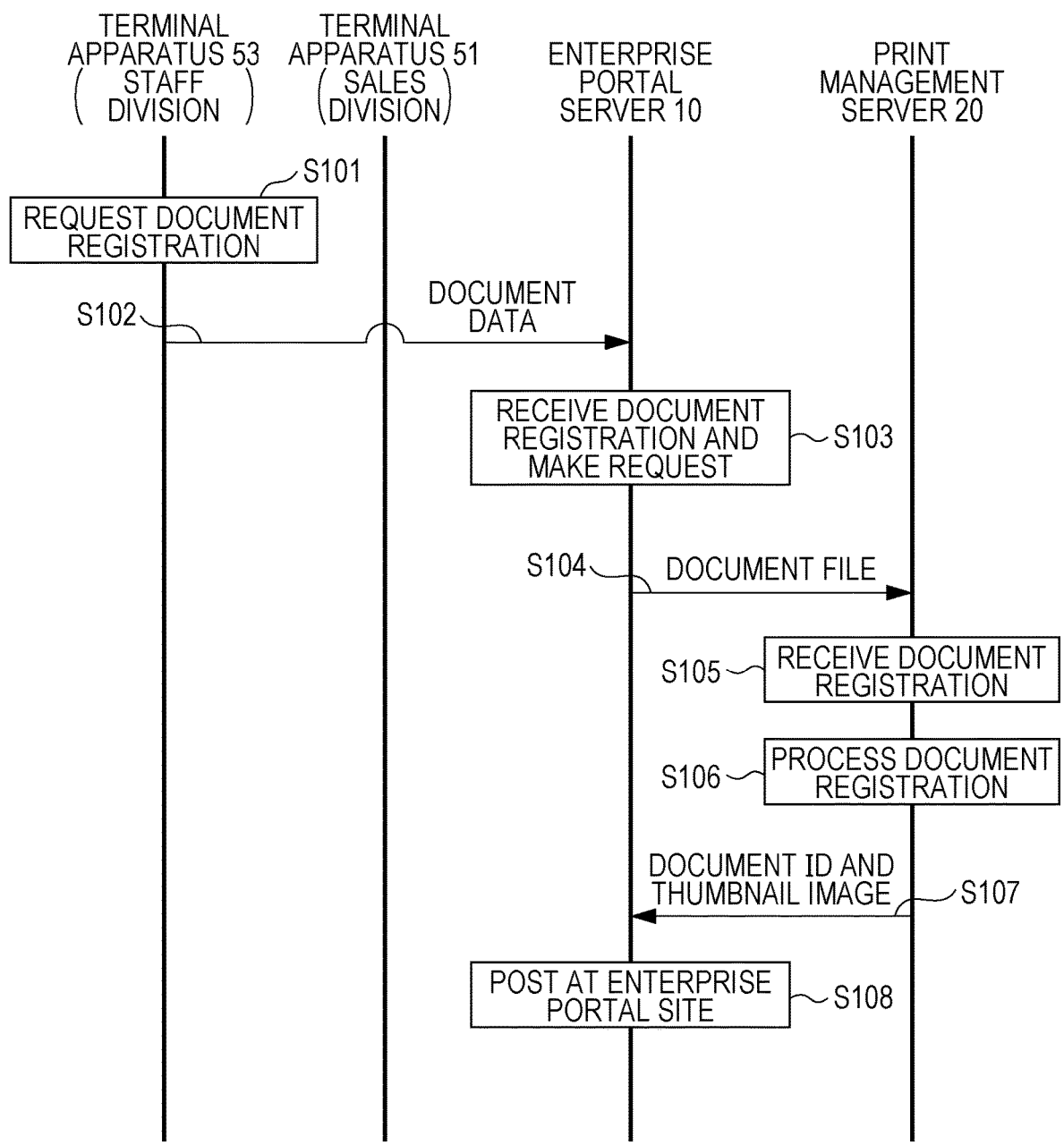
FIG. 15 is a sequence chart that describes a process performed to register document data on an enterprise portal site.

An operation of registering the document data on the enterprise portal site is described with reference to a sequence chart in FIG. 15.

In step S101, a user in the staff division requests the enterprise portal server 10 to register a document using the terminal apparatus 53. In step S102, the document data is then transmitted from the management table memory 45 to the enterprise portal server 10.

In step S103, the enterprise portal server 10 receives the document registration request and requests the print management server 20 to register a document. In step S104, the document data is transmitted from the enterprise portal server 10 to the print management server 20.

The print management server 20 receives the document registration request in step S105 and registers the document in step S106. In the document registration operation, the document ID is issued for the document data for which the registration request is made and the thumbnail image of the document is generated. The document ID and thumbnail image are returned to the enterprise portal server 10 in step S107.

In step S108, the enterprise portal server 10 posts the document ID and thumbnail image transmitted from the print management server 20 on the enterprise portal site.

Figure 16:
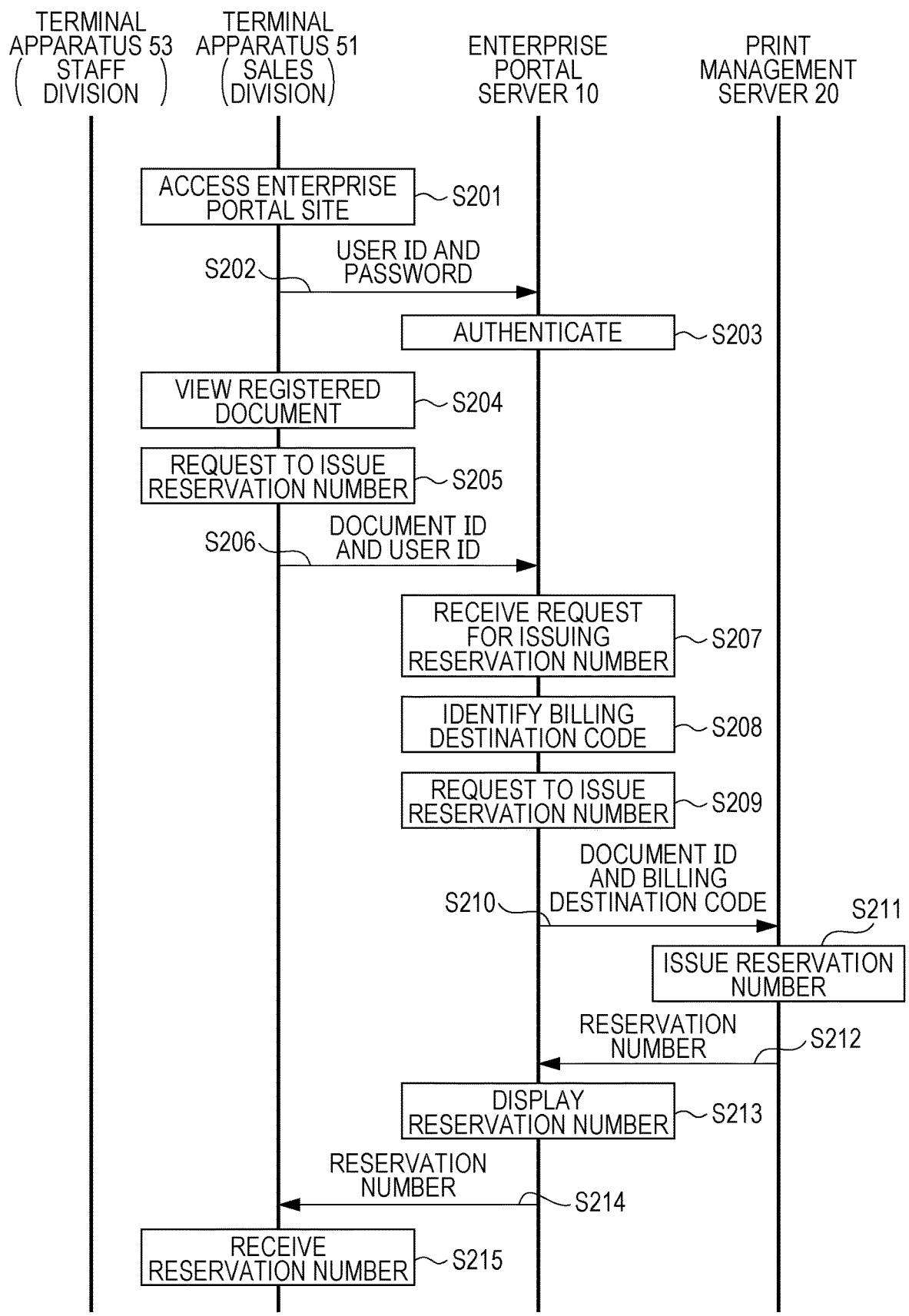
FIG. 16 is a sequence chart that describes a process to issue a reservation number for a document posted in a document list in the enterprise portal site.

FIG. 16 is a sequence chart of an issue operation of the reservation number that is performed for the document that is posted in the document list at the enterprise portal site as described above.

In step S201, a user in the sales division performs an operation to access the enterprise portal site using the terminal apparatus 51. In step S202, the user ID and password are transmitted to the enterprise portal server 10.

In step S202, the enterprise portal server 10 performs an authentication operation by using the user ID and password transmitted.

When the user in the sales division is authenticated through the authentication operation, the registered documents are viewed on the terminal apparatus 51 in step S204. FIG. 17 illustrates a list of registered documents displayed on the terminal apparatus 51.

Referring to FIG. 17, a worker BBB of a company B accesses the enterprise portal site provided by the enterprise portal server 10. In this display example, the document name of each posted document, registration date, thumbnail image, and reservation number issue button 81 are displayed together with a reservation number issue button 81.

Referring to FIG. 17, the user BBB in the sales division selects the reservation number issue button 81 corresponding to the document data having the document name "Comparison materials with Corporation FFF".

A reservation number issue request is made by selecting the reservation number issue button 81 in step S205 and the document ID and user ID are transmitted to the enterprise portal server 10 in step S206.

Specifically, the user ID "U0002" of the user BBB and the document ID "DOC12345" of the document data "Comparison materials with Corporation FFF" are transmitted to the enterprise portal server 10.

The enterprise portal server 10 receives the reservation number issue request in step S207 and identifies the billing destination code in step S208.

Specifically, the enterprise portal server 10 identifies from the user ID management table in FIG. 4 the billing destination division name of the user BBB having the user ID U0002 as a sales division 2 and identifies a billing destination code "D002" of the sales division 2 from the billing destination management table in FIG. 5.

In step S209, the enterprise portal server 10 requests the print management server 20 to issue the reservation number including the document ID and billing destination code.

In step S210, the enterprise portal server 10 transmits the document ID and billing destination code to the print management server 20.

The print management server 20 receives the reservation number issue request from the enterprise portal server 10. In step S211, the print management server 20 issues the reservation number.

For example, the reservation number "AS98XM1PB" corresponding to the document ID DOC12345 and the billing destination code D002 may now be issued.

The reservation number AS98XM1PB thus issued is managed in association with the document ID DOC12345 and the billing destination code D002 in the reservation number management table in FIG. 12.

The reservation number AS98XM1PB issued by the print management server 20 is transmitted to the enterprise portal server 10 in step S212.

In step S213, the enterprise portal server 10 displays the reservation number transmitted from the print management server 20 on the enterprise portal site.

FIG. 18 illustrates a display example of reservation numbers on the enterprise portal site.

Referring to FIG. 18, the reservation number issue button 81 corresponding to the document data having the document name "Comparison materials with Corporation FFF" is replaced with a reservation number 82 "AS98XM1PB".

Specifically, if the user desiring to issue the reservation number to print the document data posted on the enterprise portal site operates the reservation number issue button 81 corresponding to the document data, the reservation number issue button 81 is replaced with the reservation number 82.

When the user views the enterprise portal site on the terminal apparatus 51, the terminal apparatus 51 receives the reservation number from the enterprise portal server 10 in step S214 and acquires the reservation number in step S215.

If another user belonging to the sales division 2 views the enterprise portal site via performing the authentication operation and selects the reservation number issue button 81 corresponding to the document data of the document name "Comparison materials with Corporation FFF", the reservation number 82 "AS98XM1PB" previously issued is displayed. Specifically, given the same document ID and the same billing destination code, the same reservation number is issued.

If the other user in the sales division 2 is authenticated and views the enterprise portal site with the reservation number issued, the reservation number issue button 81 corresponding to the document data "Comparison materials with Corporation FFF" is not displayed but the reservation number 82 "AS98XM1PB" issued may be displayed.

FIGS. 17 and 18 thus illustrate the display examples in which the reservation number is issued when the user selects the reservation number issue button 81. For a group to which a user having a higher frequency of printing document data belongs, a reservation number may be issued when the document data is registered.

For example, if the sales division 1 in the billing destination management table in FIG. 5 has a larger number of users and has a higher frequency of printing, the reservation number having the sales division 1 as the billing destination may be issued beforehand when the document data is registered.

If the user AAA belonging to the sales division 1 accesses the enterprise portal site, the reservation numbers corresponding to all the document data posted on the enterprise portal site are displayed in an issued state as illustrated in FIG. 19.

A print operation that is performed in accordance with the reservation number thus issued is described below with reference to a sequence chart in FIG. 20.

If a print instruction is executed by entering the reservation number on the image forming apparatus 50 in step S301, the image forming apparatus 50 transmits the reservation number to the print management server 20 in step S302.

In step S303, the print management server 20 reads from the print data memory 44 the print data corresponding to the print instruction received. The print management server 20 transmits the read print data to the image forming apparatus 50 in step S304.

In step S305, the print management server 20 transmits to the image forming apparatus 50 the reservation number and the corresponding print data.

The image forming apparatus 50 performs the print operation in accordance with the received print data and transmits print result information to the print management server 20. The print result information is transmitted from the image forming apparatus 50 to the print management server 20.

The print management server 20 receives the print result information from the image forming apparatus 50 in step S309 and registers the print result information as print results on the print result data memory 43 in step S310.

In accordance with the exemplary embodiment, the enterprise portal server 10 and the print management server 20 are separate apparatuses. The disclosure is not limited to this configuration. The disclosure is also applicable to one unitary information processing apparatus into which the enterprise portal server 10 and the print management server 20 are integrated.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus, comprising:
   a registration unit that registers an image that is to be output;
   a receiving unit that receives an instruction to issue identification information identifying the image that is registered by the registration unit;
   an identifying unit that identifies a billing destination when the image which the instruction to issue the identification information is provided for is output; and
   an issuing unit that issues the identification information, associated with the billing destination identified by the identifying unit, for the image which the receiving unit has received the instruction to issue the identification information for, wherein
   the identifying unit identifies the billing destination that is used to bill a group of a user who is authenticated when the image registered by the registration unit is viewed, as a billing destination when the image which the instruction to issue the identification information is provided for is output, and
   if a user belonging to a same group has provided the instruction to issue the identification information for a same image, the issuing unit issues same identification information.

2. The information processing apparatus according to claim 1, wherein if the image is registered by the registration unit, the issuing unit issues for each of the images registered the identification information associated with a predetermined billing destination.

3. The information processing apparatus according to claim 2, wherein the predetermined billing destination is used to bill a group that is estimated to have a higher frequency of image outputting.

4. The information processing apparatus according to claim 3, further comprising:
   a display controller that performs control to display the identification information issued by a first user to a second user who is authenticated when the image registered by the registration unit is viewed if the first user belonging to a same group as the second user has issued identification information for any image registered by the registration unit.

5. The information processing apparatus according to claim claim 2, further comprising:
   a display controller that performs control to display the identification information issued by a first user to a second user who is authenticated when the image registered by the registration unit is viewed if the first user belonging to a same group as the second user has issued identification information for any image registered by the registration unit.

6. The information processing apparatus according to claim 1, wherein if the image is registered by the registration, the issuing unit does not issue any identification information that is associated with the billing destination.

7. The information processing apparatus according to claim 1, further comprising:
   a display controller that performs control to display the identification information issued by a first user to a second user who is authenticated when the image registered by the registration unit is viewed if the first user belonging to a same group as the second user has issued identification information for any image registered by the registration unit.

8. A non-transitory computer readable medium storing a program causing a computer to execute a process for processing information, the process comprising:
   registering an image that is to be output;
   receiving an instruction to issue identification information identifying the registered image;
   identifying a billing destination when the image which the instruction to issue the identification information is provided for is output;
   issuing the identification information, associated with the identified billing destination, for the image which the instruction to issue the identification information is received for;
   identifying the billing destination that is used to bill a group of a user who is authenticated when the registered image is viewed, as a billing destination when the image which the instruction to issue the identification information is provided for is output; and
   if a user belonging to a same group has provided the instruction to issue the identification information for a same image, issuing same identification information.

9. An information processing apparatus, comprising:
   registration means for registering an image that is to be output;
   receiving means for receiving an instruction to issue identification information identifying the image that is registered by the registration means;
   identifying means for identifying a billing destination when the image which the instruction to issue the identification information is provided for is output; and
   issuing means for issuing the identification information, associated with the billing destination identified by the identifying means, for the image which the receiving means has received the instruction to issue the identification information for, wherein
   the identifying means identifies the billing destination that is used to bill a group of a user who is authenticated when the image registered by the registration means is viewed, as a billing destination when the image which the instruction to issue the identification information is provided for is output, and
   if a user belonging to a same group has provided the instruction to issue the identification information for a same image, the issuing means issues same identification information.

* * * * *